(12) United States Patent
Lee et al.

(10) Patent No.: US 8,848,156 B2
(45) Date of Patent: Sep. 30, 2014

(54) LIQUID CRYSTAL DISPLAY DEVICE

(75) Inventors: Sang-Wook Lee, Gyeonggi-do (KR);
Hyun-Jin Park, Gyeonggi-do (KR);
Jong-Hoon Woo, Gyeonggi-do (KR);
Dong-Kyu Yoon, Gyeonggi-do (KR);
Woo-Keun Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 333 days.

(21) Appl. No.: 12/946,242

(22) Filed: Nov. 15, 2010

(65) Prior Publication Data

US 2011/0141421 A1 Jun. 16, 2011

(30) Foreign Application Priority Data

Dec. 11, 2009 (KR) ........................ 10-2009-0123495

(51) Int. Cl.
*G02F 1/1339* (2006.01)
*G02F 1/141* (2006.01)
*G02F 1/1343* (2006.01)
*G02F 1/139* (2006.01)
*G02F 1/137* (2006.01)

(52) U.S. Cl.
CPC ........ *G02F 1/134309* (2013.01); *G02F 1/1418* (2013.01); *G02F 2001/13793* (2013.01); *G02F 1/134363* (2013.01); *G02F 1/1393* (2013.01)
USPC ............................. 349/156; 349/138; 349/141

(58) Field of Classification Search
None
See application file for complete search history.

(56) References Cited

U.S. PATENT DOCUMENTS

| | | | |
|---|---|---|---|
| 7,342,632 B2* | 3/2008 | Miyachi et al. | 349/141 |
| 2003/0142259 A1* | 7/2003 | Asai et al. | 349/141 |
| 2005/0179847 A1 | 8/2005 | Miyachi et al. | |
| 2008/0129901 A1* | 6/2008 | You et al. | 349/33 |

OTHER PUBLICATIONS

Ge et al., "Electro-optics of polymer-stabilized blue phase liquid crystal displays", American Institute of Physics, Applied Physics Letters 94, 101104, 2009.

Chinese Office Action (and English translation) dated Jan. 14, 2013, issued by the State Intellectual Property Office of China in Chinese Patent Application No. 201010599657.6.

* cited by examiner

*Primary Examiner* — Richard Kim
(74) *Attorney, Agent, or Firm* — Morgan, Lewis & Bockius LLP

(57) ABSTRACT

A liquid crystal display device includes: first and second substrates facing and spaced apart from each other; a plurality of insulating patterns on an inner surface of the first substrate; a plurality of pixel electrodes and a plurality of common electrodes on the plurality of insulating patterns, the plurality of pixel electrodes alternating with the plurality of common electrodes, the adjacent pixel and common electrodes generating a horizontal electric field according to a driving voltage; and a liquid crystal layer between the first and second substrates, the liquid crystal layer including one of a blue phase liquid crystal molecules and a uniform standing helix liquid crystal molecules.

12 Claims, 11 Drawing Sheets

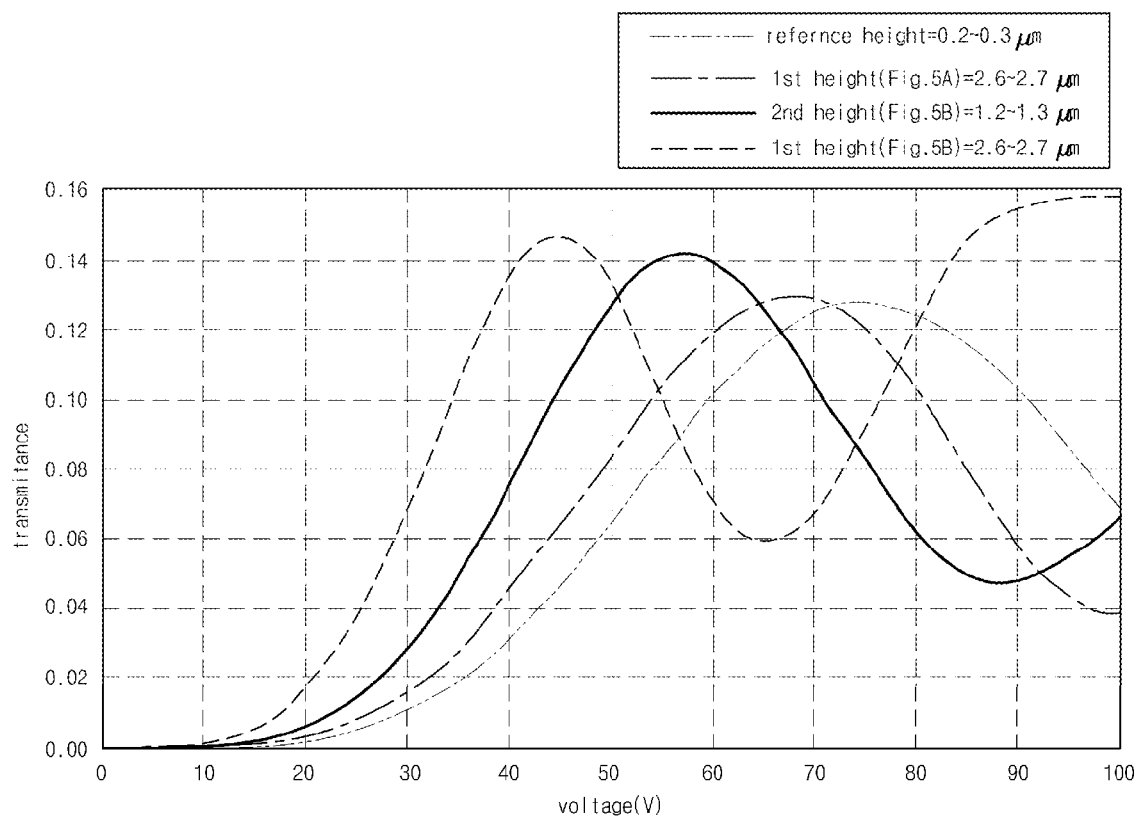

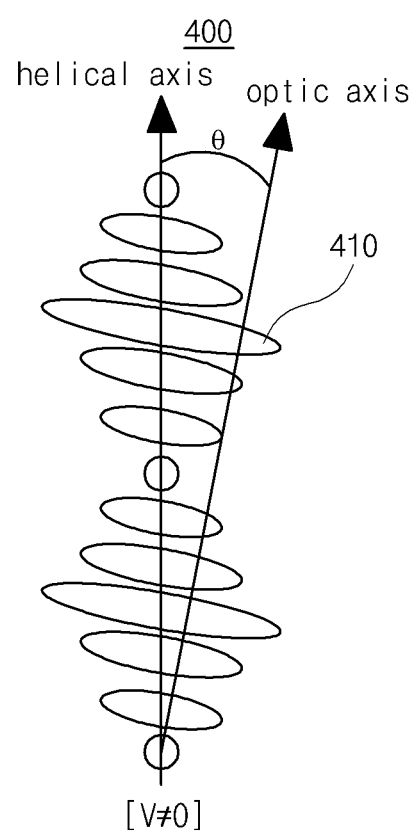

[V=0]

[V≠0]

LIQUID CRYSTAL DISPLAY DEVICE

The present application claims the benefit of Korean Patent Application No. 10-2009-0123495 filed in Korea on Dec. 11, 2009, which is hereby incorporated by reference in its entirety.

BACKGROUND OF THE INVENTION

1. Field of the Invention

The present invention relates to a liquid crystal display (LCD) device, and more particularly, to a liquid crystal display device where a driving voltage is reduced due to pixel and common electrodes in a liquid crystal layer.

2. Discussion of the Related Art

As information technology progresses, flat panel display (FPD) devices having light weight, thin profile and low power consumption have been developed. Specifically, a cathode ray tube (CRT) has been replaced by the FPD devices such as a liquid crystal display (LCD) device, a plasma panel display (PDP) device, an electroluminescent display (ELD) device and a field emission display (FED) device.

Among various FPD devices, LCD devices have been widely used for a notebook computer, a monitor and a television due to their superiority in displaying moving images and high contrast ratio. LCD devices include a liquid crystal layer and the liquid crystal layer may include one of nematic liquid crystal molecules, smectic liquid crystal molecules and cholesteric liquid crystal molecules.

Since LCD devices have a low response speed, a display quality of LCD devices is deteriorated due to a residual image. Accordingly, LCD devices having a high response speed have been the subject of recent research and development. Specifically, a uniform standing helix (USH) mode LCD device and a blue phase mode LCD device have been suggested. However, a USH mode LCD device and a blue phase mode LCD device have disadvantages of a high driving voltage.

SUMMARY OF THE INVENTION

Accordingly, the present invention is directed to a liquid crystal display device that substantially obviates one or more of the problems due to limitations and disadvantages of the related art.

An object of the present invention is to provide a liquid crystal display device where a driving voltage is reduced and a respond speed is improved.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes: first and second substrates facing and spaced apart from each other; a plurality of insulating patterns on an inner surface of the first substrate; a plurality of pixel electrodes and a plurality of common electrodes on the plurality of insulating patterns, the plurality of pixel electrodes alternating with the plurality of common electrodes, the adjacent pixel and common electrodes generating a horizontal electric field according to a driving voltage; and a liquid crystal layer between the first and second substrates, the liquid crystal layer including one of a blue phase liquid crystal molecules and a uniform standing helix liquid crystal molecules.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 6 is a graph showing a transmittance change according to a voltage applied to a pixel electrode and a common electrode in blue phase mode liquid crystal display devices according to first and second embodiments of the present invention;

FIGS. 8A and 8B are side views showing an OFF state and an ON state, respectively, of a uniform standing helix liquid crystal layer for a liquid crystal display device according to a third embodiment of the present invention;

DETAILED DESCRIPTION OF THE PREFERRED EMBODIMENTS

Reference will now be made in detail to the preferred embodiments, examples of which are illustrated in the accompanying drawings.

Figure 1:
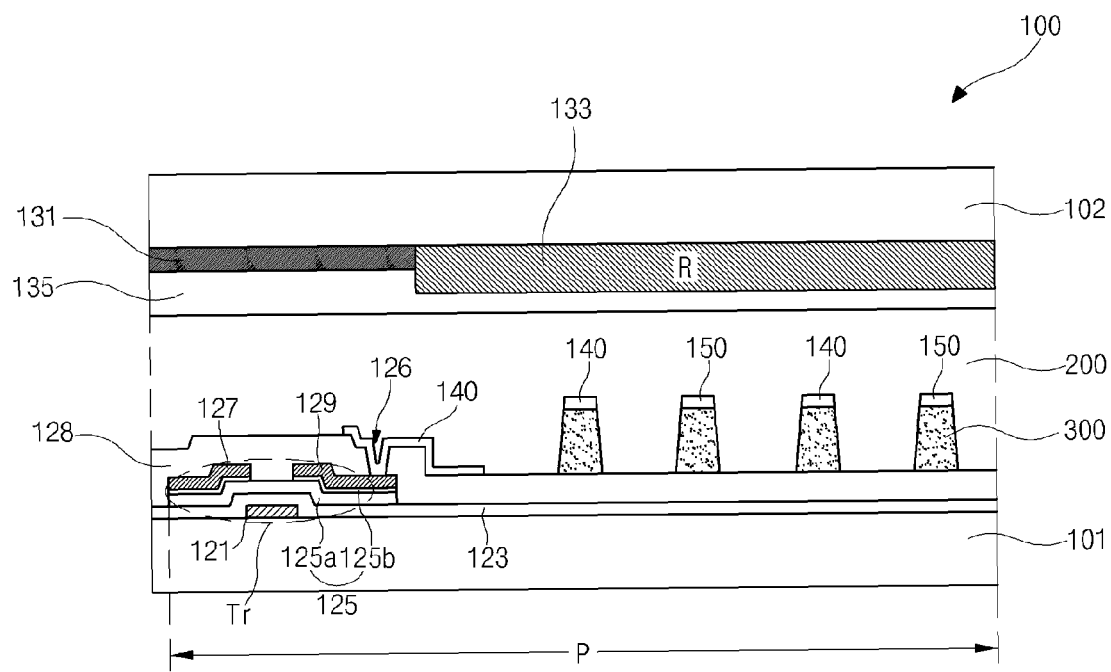
FIG. 1 is a cross-sectional view showing a blue phase mode liquid crystal display device according to a first embodiment of the present invention.
Figure 2:
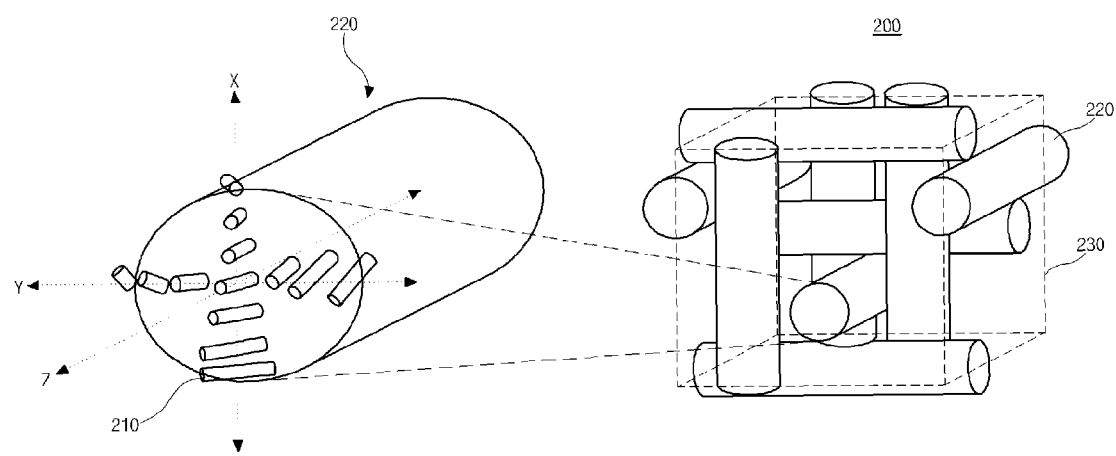
FIG. 2 is a view showing a blue phase liquid crystal layer of a blue phase mode liquid crystal display device according to a first embodiment of the present invention.

FIG. 1 is a cross-sectional view showing a blue phase mode liquid crystal display device according to a first embodiment of the present invention, and FIG. 2 is a view showing a blue phase liquid crystal layer of a blue phase mode liquid crystal display device according to a first embodiment of the present invention.

In FIG. 1, a blue phase mode liquid crystal display (LCD) device 100 includes first and second substrates 101 and 102 facing and spaced apart from each other and a blue phase liquid crystal layer 200 between the first and second substrates 101 and 102. The blue phase liquid crystal layer 200 has an optically isotropic state in a 3-dimension or a 2-dimension when no electric field is applied, while the blue phase liquid crystal layer 200 has a birefringence when an electric field is applied. Accordingly, when a voltage is applied, the blue phase liquid crystal layer 200 has a uniaxial property and a viewing angle dependency in transmittance similarly to a nematic liquid crystal layer. In addition, since the blue phase liquid crystal layer 200 does not have an initial alignment of an optically anisotropic state, the blue phase liquid crystal layer 200 is re-aligned along a direction of an electric field differently from a nematic liquid crystal layer. For example, the blue phase liquid crystal layer 200 may have a smectic blue phase and a cholesteric blue phase.

In FIG. 2, a blue phase liquid crystal layer 200 includes a plurality of double twist cylinders (DTCs) 220 arranged in a cubic lattice 230. Each of the plurality of DTCs 220 includes liquid crystal molecules 210 arranged along two axes (x and y axes) perpendicular to an axis (z axis) of a cylinder with a twist angle. The outer liquid crystal molecules with respect to the z axis are twisted with a larger twist angle. Accordingly, the liquid crystal molecules 210 in each of the plurality of DTCs 220 have a directional property with respect to the axis (z axis) of the cylinder.

The blue phase of the liquid crystal molecules 210 is obtained under a temperature range between a chiral nematic phase and an isotropic phase. For example, the blue phase may be obtained under a narrow temperature range of about 1~2° C. Accordingly, an exact temperature control is required to obtain the blue phase of the liquid crystal molecules 210.

To enlarge the temperature range for the blue phase, the cubic lattice 230 of the plurality of DTCs 220 of the blue phase may be stabilized by a polymer. When the polymer is mixed with the liquid crystal molecules 210, the polymer is combined with the liquid crystal molecules 210 having no directional property rather than the liquid crystal molecules 210 having the directional property in the plurality of DTCs 220. As a result, the cubic lattice 230 of the plurality of DTCs 220 is stabilized and the temperature range for the blue phase is enlarged to about 0~50° C.

For example, the liquid crystal molecules 210 stabilized by a polymer may include one of the following three materials.

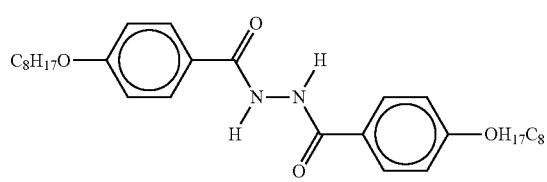

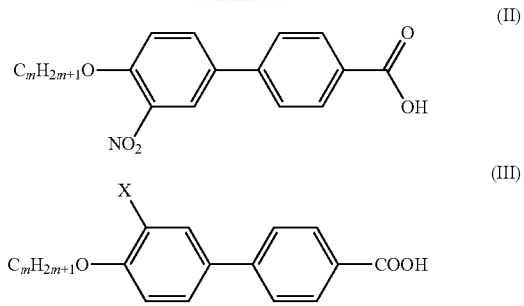

In addition, the liquid crystal molecules 210 stabilized by a polymer may include 4-cyano-4'-pentylbiphenyl or a composition of above four materials.

The liquid crystal molecules 210 stabilized by a polymer may include a monomer, a photoinitiator and a polymer such as a binder. The polymer stabilizes the liquid crystal molecules 210 and enlarges the temperature range for a blue phase to about 0~50° C. The monomer includes a photo-polymerizable compound having a carbon-to-carbon unsaturated bond and a carbon-to-carbon ring-shaped bond. For example, the monomer may include an acrylic compound such as 1,3-butyleneglicoldiacrylate, 1,4-butanedioldiacrylate and ethyleneglycoldiacrylate. The photoinitiator is an initiator for photo-polymerization and includes at least one acetophenone compound. For example, the photoinitiator may include diethoxyacetophenone, 2-methyl-2-monopolyno-1-(4-methylthiophenyl)propane-1-one, 2-hydroxy-2-methyl-1-phenylpropane-1-one. In addition, the photoinitiator may include a benzoin compound, a benzophenone compound, a thioxanthone compound and a triazine compound. For example, the benzoin compound may include benzoin, benzoinmethylether and benzomethylether. The thioxanthone compound may include 2-isopropylthioxanthone, 4-isopropylthioxanthone and 2,4-diethylthioxantone, and the triazine compound may include 2,4-trichloromethyl-(piperonyl)-6-triazine, 2,4-bis(trichloromethyl)-6-(4-methoxynaphthyl)-1,3,5-triazine.

The binder includes an acrylic co-polymer having a co-polymer of a carboxylic monomer and the other monomer co-polymerizable with the carboxylic monomer. For example, the carboxylic monomer may be an unsaturated carboxylic acid and the unsaturated carboxylic acid may include an acrylic acid, a methacrylic acid and a crotonic acid. The monomer co-polymerizable with the carboxylic monomer may include styrene, α-methylstyrene, o-vinyltoluene.

When an electric field is not applied to the liquid crystal molecules 210 stabilized by a polymer, the liquid crystal molecules 210 are randomly aligned. In addition, when an electric field is applied to the liquid crystal molecules 210 stabilized by a polymer, the liquid crystal molecules 210 are aligned along the electric field. As a result, the blue phase liquid crystal layer 200 of an isotropic polar material has a refractive index proportional to a square of a driving voltage, which is referred to as a Kerr effect, and a response speed of the blue phase mode LCD device 100 is improved due to the Kerr effect.

The refractive index of the blue phase liquid crystal layer 200 is determined according to regions where an electric field is generated. Accordingly, when an electric field is uniformly generated, uniformity in brightness is obtained and display property of the blue phase mode LCD device 100 is improved.

Further, since an alignment step for the blue phase liquid crystal layer 200 is not required, an orientation film and a rubbing step are omitted.

Therefore, when the blue phase liquid crystal molecules 210 stabilized by a monomer is used for the liquid crystal layer 200, the liquid crystal layer 200 is dynamically rotated according to an electric field and a response time of the blue phase mode LCD device 100 is reduced. In addition, a display property of the blue phase mode LCD device 100 is improved and an efficiency of fabrication is improved due to omission of an orientation film and a rubbing step.

The liquid crystal molecules 210 have an optically isotropic without a horizontal electric field due to a driving voltage and have a birefringence with a horizontal electric field due to a driving voltage. Accordingly, the optic properties of the blue phase liquid crystal layer 200 are adjusted by a horizontal electric field generated between electrodes. As a result, the blue phase mode LCD device 100 may include a pixel electrode and a common electrode formed on the same substrate so that a horizontal electric field can be generated between the pixel electrode and the common electrode. In addition, first and second polarizing plates have first and second polarization axes, respectively, perpendicular to each other.

Referring again to FIG. 1, a gate line (not shown), a gate electrode 121 connected to the gate line and a common line (not shown) parallel to and spaced apart from the gate line are formed on an inner surface of the first substrate 101. A gate insulating layer 123 is formed on the gate line, the gate electrode 121 and the common line. A semiconductor layer 125 is formed on the gate insulating layer 123 over the gate electrode 121, and source and drain electrodes 127 and 129 are formed on the semiconductor layer 125. The semiconductor layer 125 may include an active layer 125a of intrinsic amorphous silicon and an ohmic contact layer 125b of impurity-doped amorphous silicon. In addition, a data line (not shown) connected to the source electrode 127 is formed on the gate insulating layer 123. The data line crosses the gate line to define a pixel region P. The gate electrode 121, the semiconductor layer 125, the source electrode 127 and the drain electrode 129 constitute a thin film transistor (TFT) Tr.

A passivation layer 128 is formed on the TFT Tr, and a plurality of pixel electrodes 140 are formed over the passivation layer 128 in each pixel region P. The passivation layer 128 includes a drain contact hole 126 exposing the drain electrode 129, and the plurality of pixel electrodes 140 are connected to the drain electrode 129 through the drain contact hole 126. Further, a plurality of common electrodes 150 connected to the common line are formed over the passivation layer 128 in each pixel region P. The plurality of pixel electrodes 140 have the same material and the same layer as the plurality of common electrodes 150. In addition, the plurality of pixel electrodes 140 are alternately disposed with the plurality of common electrodes 150.

Specifically, an insulating pattern 300 is formed between each of the plurality of pixel electrodes 140 and the plurality of common electrodes 150 and the passivation layer 128. The insulating pattern 300 may be formed of an organic insulating material such as benzocyclobutene (BCB) and acrylic resin. The plurality of pixel electrodes 140 and the plurality of common electrodes 150 have a height corresponding to a middle portion of the blue phase liquid crystal layer 200 due to the insulating pattern 300. As a result, a horizontal electric field generated between the pixel electrode 140 and the common electrode 150 is strengthened.

A black matrix 131 having openings is formed on an inner surface of the second substrate 102 and a color filter layer 133 is formed on the black matrix 131. The color filter layer 133 includes red, green and blue color filters corresponding to the openings of the black matrix 131. An overcoat layer 135 is formed on the color filter layer 133.

In the blue phase mode LCD device 100, the plurality of pixel electrodes 140 and the plurality of common electrodes 150 are formed on the first substrate 101, and the liquid crystal molecules 210 in the blue phase liquid crystal layer 200 are re-aligned along the horizontal electric field generated between the pixel electrode 140 and the common electrode 150, thereby images displayed.

Figure 3A:
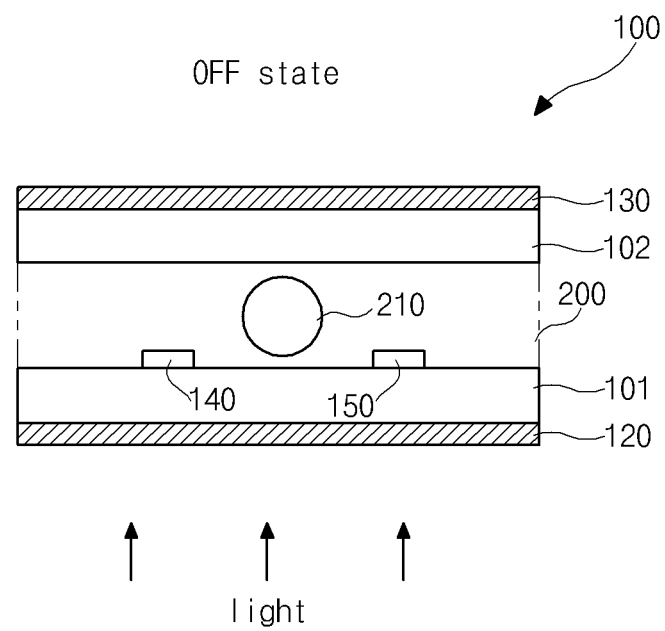
FIGS. 3A and 3B are cross-sectional views showing OFF and ON states, respectively, of a blue phase mode liquid crystal display device according to a first embodiment of the present invention.
Figure 3B:
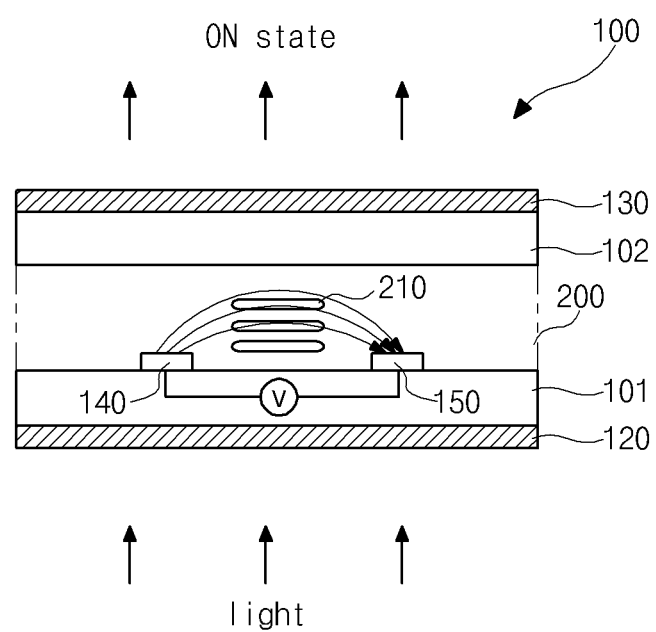

FIGS. 3A and 3B are cross-sectional views showing OFF and ON states, respectively, of a blue phase mode liquid crystal display device according to a first embodiment of the present invention.

In FIGS. 3A and 3B, a blue phase mode liquid crystal display (LCD) device 100 includes a liquid crystal panel and a backlight unit (not shown) supplying light to the liquid crystal panel. The liquid crystal panel includes first and second substrates 101 and 102 facing and spaced apart from each other and a blue phase liquid crystal layer 200 between the first and second substrates 101 and 102. A pixel electrode 140 and a common electrode 150 are formed on an inner surface of the first substrate 101. An insulating pattern 300 (of FIG. 1) under each of the pixel electrode 140 and the common electrode 150 is omitted in FIGS. 3A and 3B for illustrating a driving principle. In addition, a first polarizing plate 120 is formed on an outer surface of the first substrate 101, and a second polarizing plate 130 is formed on an outer surface of the second substrate 102.

Since liquid crystal molecules 210 in the blue phase liquid crystal layer 200 are re-aligned along a horizontal electric field parallel to the first and second substrates 101 and 102 to have a birefringence, the first and second polarizing plates 120 and 130 are formed for obtaining a maximum brightness such that a first polarization axis of the first polarizing plate 120 is perpendicular to a second polarization axis of the second polarizing plate 130. In addition, each of the first and second polarization axes may form an angle of about 45° with respect to the horizontal electric field.

In FIG. 3A, the light from the backlight unit is linearly polarized along the first polarization axis through the first polarizing plate 120. In an OFF state where no voltage is applied and no horizontal electric field is generated, a plurality of DTCs 220 (of FIG. 2) are arranged in a cubic lattice 230 (of FIG. 2). As a result, each liquid crystal molecule has a spherical shape and is optically isotropic. ($n_x = n_y$.) The linearly polarized light passes through the blue phase liquid crystal layer 200 without change in polarization direction, and the linearly polarized light is completely absorbed to the second polarizing plate 120. Accordingly, the blue phase mode LCD device 100 displays a black image.

In FIG. 3B, the light from the backlight unit is linearly polarized along the first polarization axis through the first polarizing plate 120. In an ON state where a voltage is applied to the pixel electrode 140 and the common electrode 150 and a horizontal electric field is generated between the pixel electrode 140 and the common electrode 150, the cubic lattice 230 of the plurality of DTCs 220 is distorted and a birefringence is induced in the liquid crystal molecules 210. As a result, each liquid crystal molecule 210 has an elliptical shape perpendicular to the horizontal electric field and is optically anisotropic. ($n_x > n_y$.)

While the linearly polarized light passes through the blue phase liquid crystal layer 200, a component of the linearly polarized light parallel to director of the liquid crystal molecules 210 is transmitted to the second polarizing plate 130 and the other component is absorbed to the blue phase liquid crystal layer 200. In addition, a component of the transmitted light parallel to the second polarization axis passes through the second polarizing plate 130 and the other component is absorbed to the second polarizing plate 130. Accordingly, the blue phase mode LCD device 100 displays a white image.

In the blue phase mode LCD device 100, the cubic lattice 230 is distorted by the horizontal electric field and a white image is displayed by using the birefringence of the blue phase liquid crystal layer 200. The birefringence is proportional to the electric field. In addition, since the blue phase liquid crystal layer 200 has a cubic lattice 230 of the plurality of DTCs 220, an electric field of several tens V/μm is required for driving the liquid crystal molecules 210. To increase the electric field, a distance between the pixel electrode 140 and the common electrode 150 may be reduced.

Figure 4:
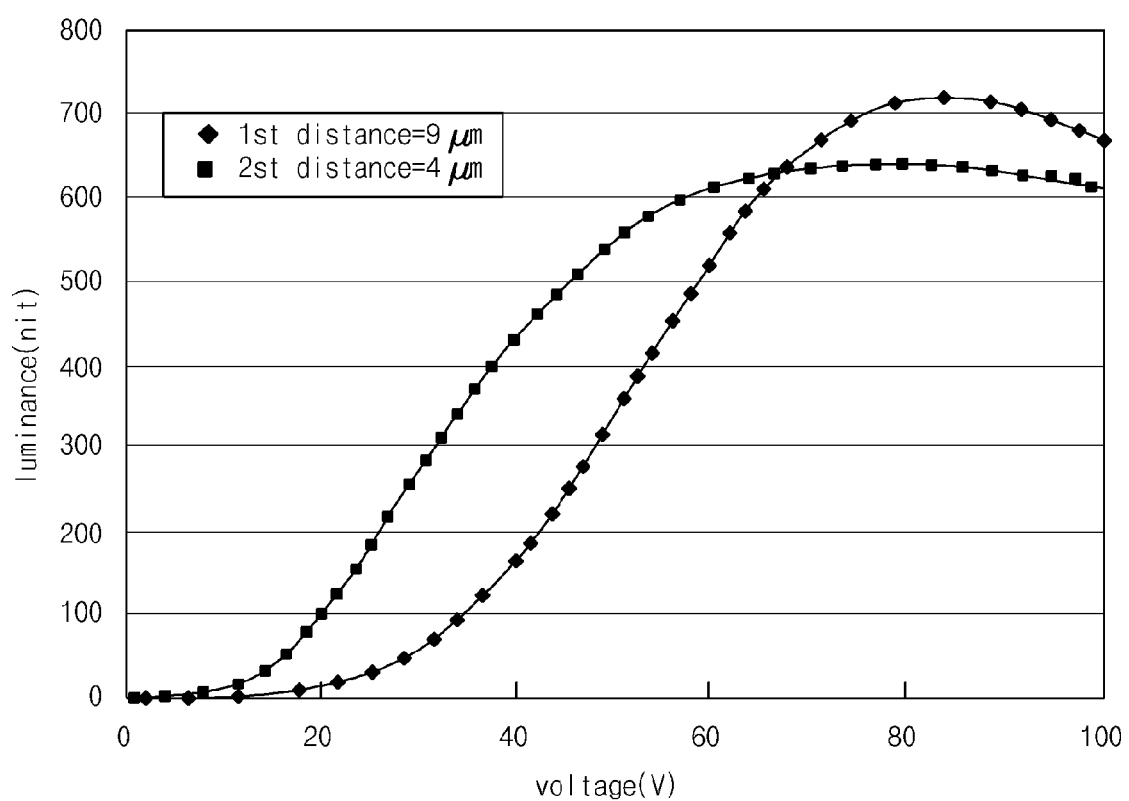
FIG. 4 is a graph showing a luminance change according to a voltage applied to a pixel electrode and a common electrode in a blue phase mode liquid crystal display device according to a first embodiment of the present invention.

FIG. 4 is a graph showing a luminance change according to a voltage applied to a pixel electrode and a common electrode in a blue phase mode liquid crystal display device according to a first embodiment of the present invention.

In FIG. 4, a luminance has a maximum value at a voltage of about 80 V when a pixel electrode and a common electrode are spaced apart from each other by a first distance of about 9 μm, while a luminance has a maximum value at a voltage of about 60 V when a pixel electrode and a common electrode are spaced apart from each other by a second distance of about 4 μm. Accordingly, as a pixel electrode and a common electrode are closer to each other, a liquid crystal layer is driven by a smaller driving voltage. In addition, as the pixel electrode 140 is closer to the common electrode 150, a stronger electric field is applied to the blue phase liquid crystal layer 200.

However, as a pixel electrode and a common electrode are closer to each other, the luminance is reduced. The reduction of the luminance causes the reduction of the aperture ratio. To generate a stronger horizontal electric field without reduction of aperture ratio, the pixel electrode 140 and the common electrode 150 are formed to have a height corresponding to a middle portion of the blue phase liquid crystal layer 200.

Figure 5A:
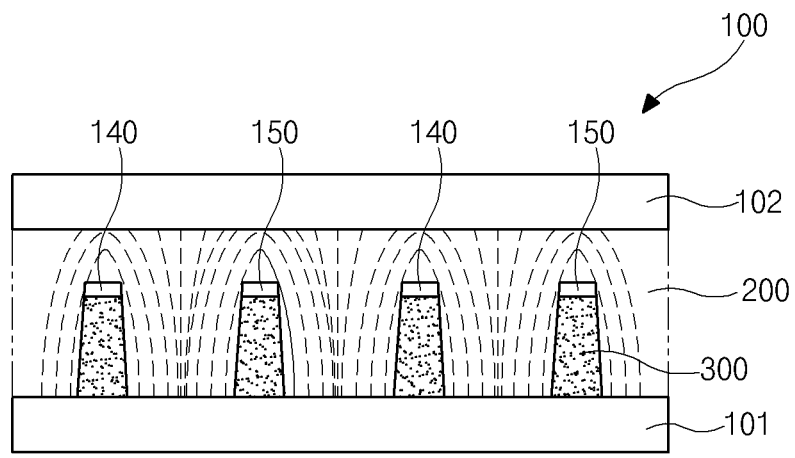
FIG. 5A is a cross-sectional view showing a pixel electrode and a common electrode of a blue phase mode liquid crystal display device according to a first embodiment of the present invention.
Figure 5B:
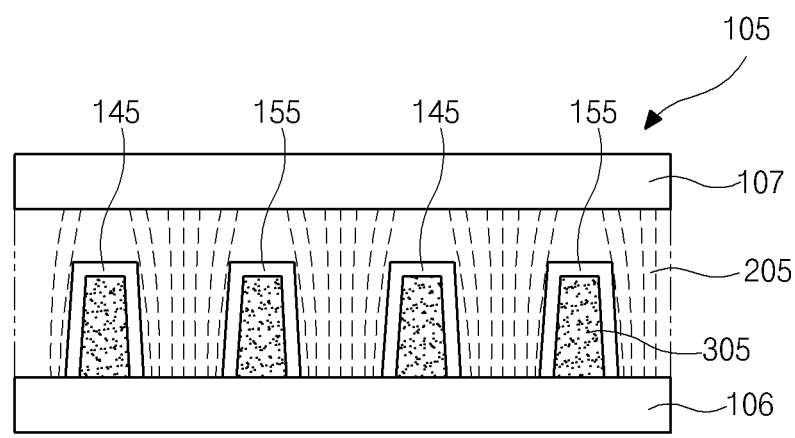
FIG. 5B is a cross-sectional view showing a pixel electrode and a common electrode of a blue phase mode liquid crystal display device according to a second embodiment of the present invention.

FIG. 5A is a cross-sectional view showing a pixel electrode and a common electrode of a blue phase mode liquid crystal display device according to a first embodiment of the present invention, and FIG. 5B is a cross-sectional view showing a pixel electrode and a common electrode of a blue phase mode liquid crystal display device according to a second embodiment of the present invention.

In FIG. 5A, a blue phase mode liquid crystal display (LCD) device 100 includes first and second substrates 101 and 102 facing and spaced apart from each other and a blue phase liquid crystal layer 200 between the first and second substrates 101 and 102. A plurality of insulating patterns 300 each having a relatively great thickness are formed on an inner surface of the first substrate 101. In addition, a plurality of pixel electrodes 140 and a plurality of common electrodes 150 are formed on the plurality of insulating patterns 300. Here, each of the plurality of pixel electrodes 140 and the plurality of common electrodes 150 is formed to cover a top surface of each of the plurality of insulating patterns 300 and expose a side surface of each of the plurality of insulating patterns 300. The plurality of pixel electrodes 140 are disposed alternately with the plurality of common electrodes 150 in each pixel region.

Each of the plurality of pixel electrodes 140 and the plurality of common electrodes 150 has a height corresponding to a middle portion of the blue phase liquid crystal layer 200 from the inner surface of the first substrate 101 due to the plurality of insulating patterns 300. For example, when the first and second substrates 101 and 102 are spaced apart from each other by a distance of about 10 μm (i.e., a cell gap of the blue phase mode LCD device 100 has a cell gap of about 10 μm), the plurality of insulating patterns 300 may have a thickness of about 1 μm to about 9 μm (i.e., a bottom surface of each of the plurality of pixel electrodes 140 and the plurality of common electrodes 150 may have a height of about 1 μm to about 9 μm).

When a driving voltage is applied to the plurality of pixel electrodes 140 and the plurality of common electrodes 150, a horizontal electric field is generated between the adjacent pixel and common electrodes 140 and 150. The dashed line of FIG. 5A shows an equipotential surface. As the height of the plurality of pixel electrodes 140 and the plurality of common electrodes 150 increases due to the plurality of insulating patterns 300, the equipotential surface is induced along a direction closer to a vertical direction. Since a direction of an electric field is perpendicular to the equipotential surface, the horizontal electric field is generated along a direction closer to a horizontal direction as compared with the horizontal electric field generated without the plurality of insulating patterns 300. As a result, a stronger horizontal electric field is generated in the blue phase liquid crystal layer 200 and the blue phase mode LCD device 100 is operated with a lower driving voltage.

In FIG. 5B, a blue phase mode liquid crystal display (LCD) device 105 includes first and second substrates 106 and 107 facing and spaced apart from each other and a blue phase liquid crystal layer 205 between the first and second substrates 106 and 107. A plurality of insulating patterns 305 each having a relatively great thickness are formed on an inner surface of the first substrate 106. In addition, a plurality of pixel electrodes 145 and a plurality of common electrodes 155 are formed on the plurality of insulating patterns 305. Here, each of the plurality of pixel electrodes 145 and the plurality of common electrodes 155 is formed to cover a side surface and a tope surface of each of the plurality of insulating patterns 305. The plurality of pixel electrodes 145 are disposed alternately with the plurality of common electrodes 155 in each pixel region.

Each of the plurality of pixel electrodes 145 and the plurality of common electrodes 155 has a height corresponding to a middle portion or an upper portion of the blue phase liquid crystal layer 205 from the inner surface of the first substrate 106 due to the plurality of insulating patterns 305. For example, when the first and second substrates 106 and 107 are spaced apart from each other by a distance of about 10 μm (i.e., a cell gap of the blue phase mode LCD device 105 has a cell gap of about 10 μm), the plurality of insulating patterns 305 may have a thickness of about 1 μm to about 10 μm (i.e., a bottom surface of each of the plurality of pixel electrodes 145 and the plurality of common electrodes 155 may have a height of about 1 μm to about 10 μm).

When a driving voltage is applied to the plurality of pixel electrodes 145 and the plurality of common electrodes 155, a horizontal electric field is generated between the adjacent pixel and common electrodes 145 and 155. Since each of the plurality of pixel electrodes 145 and the plurality of common electrodes 155 is formed on the top and side surfaces of each of the plurality of insulating patterns 305, the horizontal electric field is generated between portions of the adjacent pixel and common electrodes 145 and 155 on the side surface of each insulating pattern 305 as well as between portions of the adjacent pixel and common electrodes 145 and 155 on the top surface of each insulating pattern 305. The dashed line of FIG. 5B shows an equipotential surface. As the height of the plurality of pixel electrodes 145 and the plurality of common electrodes 155 increases due to the plurality of insulating patterns 305, the equipotential surface is induced along a direction closer to a vertical direction. In addition, the equipotential surface is induced along a direction further closer to a vertical direction due to portions of the adjacent pixel and common electrodes 145 and 155 on the side surface of each insulating pattern 305. Since a direction of an electric field is perpendicular to the equipotential surface, the horizontal electric field is generated along a direction further closer to a horizontal direction as compared with the horizontal electric field generated only between portions of the adjacent pixel and common electrodes 145 and 155 on the top surface of each insulating pattern 305. As a result, a stronger and more uniform horizontal electric field is generated in the whole blue phase liquid crystal layer 205 and the blue phase mode LCD device 105 is operated with a lower driving voltage.

Specifically, since the horizontal electric field is generated between portions of the adjacent pixel and common electrodes 145 and 155 on the side surface of each insulating pattern 305, each insulating pattern 305 may have a thickness corresponding to the cell gap such that each of the pixel electrode 145 and the common electrode 155 contacts the second substrate 107 (substantially an overcoat layer 135 on an inner surface of the second substrate 102 of FIG. 1). For example, each insulating pattern 305 may have a thickness of about 10 μm in the blue phase mode LCD device 105 having a cell gap of about μm. When each insulating pattern 305 contacts the second substrate 107, each insulating pattern 305 may function as a patterned spacer maintaining the cell gap.

FIG. 6 is a graph showing a transmittance change according to a voltage applied to a pixel electrode and a common electrode in blue phase mode liquid crystal display devices according to first and second embodiments of the present invention.

In FIG. 6, a transmittance change is measured for four blue phase liquid crystal display (LCD) devices. In a first blue phase mode LCD device, an insulating pattern is omitted and each of a pixel electrode and a common electrode has a thickness of about 0.2 μm to about 0.3 μm such that a top surface of each of the pixel electrode and the common electrode has a reference height of about 0.2 μm to about 0.3 μm with respect to an inner surface of a first substrate. In a second blue phase mode LCD device according to a first embodiment of the present invention, an insulating pattern has a thickness of about 2.4 μm and each of a pixel electrode and a common electrode covering a top surface of the insulating pattern has a thickness of about 0.2 μm to about 0.3 μm such that a top surface of each of the pixel electrode and the common electrode has a first height of about 2.6 μm to about 2.7 μm with respect to an inner surface of a first substrate. In a third blue phase mode LCD device according to a second embodiment of the present invention, an insulating pattern has a thickness of about 1.0 μm and each of a pixel electrode and a common electrode covering top and side surfaces of the insulating pattern has a thickness of about 0.2 μm to about 0.3 μm such that a top surface of each of the pixel electrode and the common electrode has a second height of about 1.2 μm to about 1.3 μm with respect to an inner surface of a first substrate. Finally, in a fourth blue phase mode LCD device according to a second embodiment of the present invention, an insulating pattern has a thickness of about 2.4 μm and each of a pixel electrode and a common electrode covering top and side surfaces of the insulating pattern has a thickness of about 0.2 μm to about 0.3 μm such that a top surface of each of the pixel electrode and the common electrode has the first height of about 2.6 μm to about 2.7 μm with respect to an inner surface of a first substrate.

The transmittance of the first blue phase mode LCD device corresponding to the reference height has a maximum value at a voltage of about 74 V, and the transmittance of the second blue phase LCD device corresponding to the first height has a maximum value at a voltage of about 68 V. In addition, the transmittance of the third blue phase LCD device corresponding to the second height has a maximum value at a voltage of about 58 V, and the transmittance of the fourth blue phase LCD device corresponding to the first height has a maximum value at a voltage of about 44 V.

Accordingly, a driving voltage is reduced without reduction of transmittance by forming each of a pixel electrode and a common electrode on an insulating pattern in a blue phase mode LCD device according to a first embodiment of the present invention, and a driving voltage is further reduced without reduction of transmittance by forming each of a pixel electrode and a common electrode on top and side surfaces of an insulating pattern in a blue phase mode LCD device according to a second embodiment of the present invention.

Figure 7A:
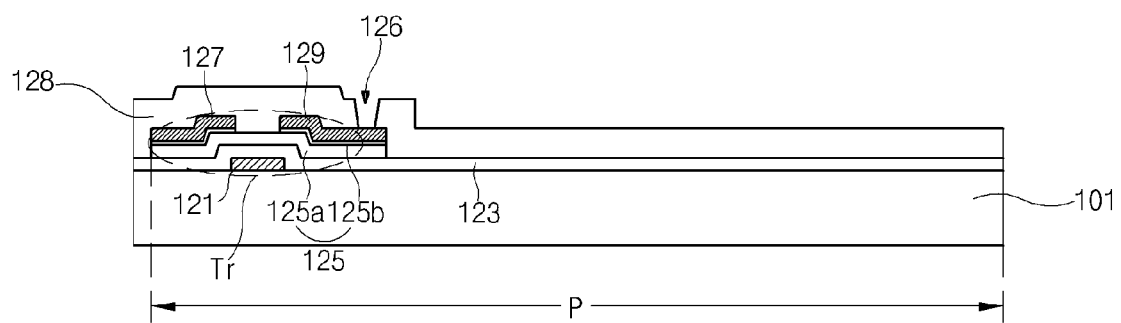
FIGS. 7A to 7C are cross-sectional views showing a method of fabricating an array substrate for a blue phase mode liquid crystal display device according to a first embodiment of the present invention.
Figure 7B:
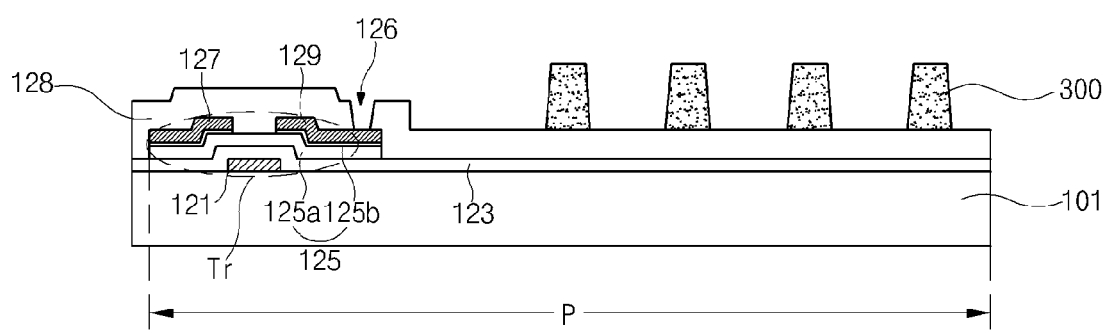
Figure 7C:
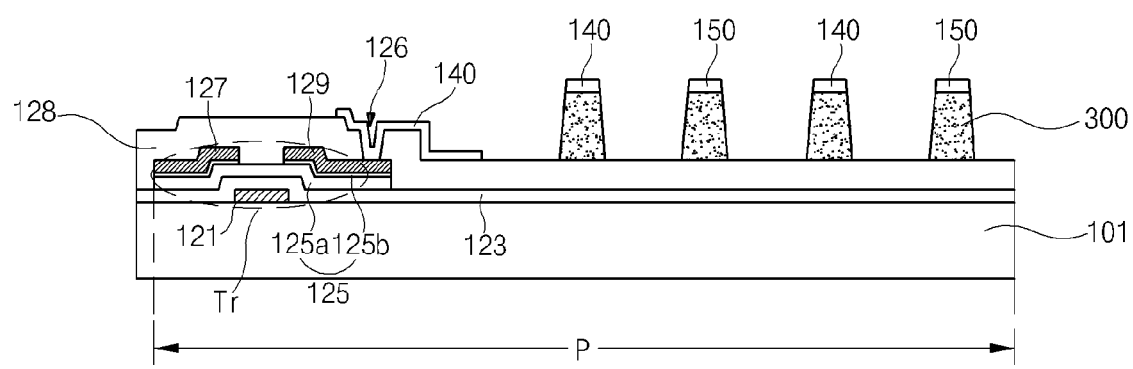

FIGS. 7A to 7C are cross-sectional views showing a method of fabricating an array substrate for a blue phase mode liquid crystal display device according to a first embodiment of the present invention.

In FIG. 7A, a gate line (not shown), a gate electrode 121 and a common line (not shown) are formed on a first substrate 101 by depositing and patterning a first metallic material. The gate electrode 121 is connected to the gate line, and the common line is parallel to and spaced apart from the gate line. The first metallic material may include one of aluminum (Al), aluminum (Al) alloy, chromium (Cr), molybdenum (Mo), tungsten (W) and copper (Cu). A gate insulating layer 123 is formed on the gate line, the gate electrode 121 and the common line by depositing an inorganic insulating material. The inorganic insulating material may include one of silicon nitride (SiNx) and silicon oxide (SiO$_2$). An active layer 125a and an ohmic contact layer 125b are sequentially formed on the gate insulating layer 123 over the gate electrode 121 by depositing and patterning intrinsic amorphous silicon (a-Si:H) and impurity-doped amorphous silicon (n+a-Si:H). The active layer 125a and the ohmic contact layer 125b constitute a semiconductor layer 125.

A source electrode 127 and a drain electrode 129 are formed on the ohmic contact layer 125b by depositing and patterning a second metallic material. Simultaneously, a data line (not shown) is formed on the gate insulating layer 123. The source electrode 127 is connected to the data line, and the drain electrode 129 is spaced apart from the source electrode 127. The data line crosses the gate line to define a pixel region P. The second metallic material may include one of aluminum (Al), aluminum (Al) alloy, chromium (Cr), molybdenum (Mo), tungsten (W) and copper (Cu). The gate electrode 121, the gate insulating layer 123, the semiconductor layer 125, the source electrode 127 and the drain electrode 129 constitute a thin film transistor (TFT) Tr. In addition, a passivation layer 128 is formed on the TFT Tr by depositing one of an inorganic insulating material and an organic insulating material. The passivation layer 128 includes a drain contact hole 126 exposing the drain electrode 129 and a common contact hole (not shown) exposing the common line.

In FIG. 7B, a plurality of insulating patterns 300 are formed on the passivation layer 128 by depositing and patterning an organic insulating material. The organic insulating material may include one of benzocyclobutene (BCB) and acrylic resin. The plurality of insulating patterns 300 may be formed through a mask process. For example, after an organic insulating material layer is formed on the passivation layer 128, a photoresist layer is formed on the organic insulating material layer. After a photo mask is disposed over the photoresist layer, light is irradiated onto the photoresist layer through the photo mask to form a photoresist pattern. In addition, after the organic insulating material layer is patterned using the photoresist pattern as an etching mask to form the plurality of insulating patterns 300, the photoresist pattern is removed through an ashing step or a stripping step.

In FIG. 7C, a plurality of pixel electrodes 140 and a plurality of common electrodes 150 are formed on the passivation layer 128 and the plurality of insulating patterns 300 by depositing and patterning a transparent conductive material. The transparent conductive material may include one of indium-tin-oxide (ITO) and indium-zinc-oxide (IZO). The plurality of pixel electrodes 140 connected to each other is connected to the drain electrode 129 through the drain contact hole 126, and the plurality of common electrodes 150 connected to each other is connected to the common line through the common contact hole. The plurality of pixel electrodes 140 are alternately disposed with the plurality of common electrodes 150 in the pixel region. Although each of the plurality of pixel electrodes 140 and the plurality of common electrodes 150 is formed on a top surface of each of the plurality of insulating patterns 300 and a side surface of each of the plurality of insulating patterns 300 is exposed in the first embodiment, the plurality of pixel electrodes and the plurality of common electrodes may be formed to cover top and side surfaces of each of the plurality of insulating patterns in the second embodiment.

Further, after an array substrate is completed, a color filter substrate including a black matrix 131 (of FIG. 1) and a color filter layer 133 (of FIG. 1) is attached to the array substrate and a blue phase liquid crystal layer 200 (of FIG. 1) is formed between the array substrate and the color filter substrate. As a result, a blue phase mode LCD device 100 (of FIG. 1) according to a first embodiment of the present invention is completed. Since each of the plurality of pixel electrodes 140 and the plurality of common electrodes 150 is formed on each of the plurality of insulating patterns 300, each of the plurality of pixel electrodes 140 and the plurality of common electrodes 150 is disposed in a middle portion of the blue phase liquid crystal and a horizontal electric field is strengthened. Accordingly, a driving voltage for the blue phase mode LCD device 100 is reduced without reduction in transmittance and aperture ratio.

The structure of the pixel electrode and the common electrode may be applied to a uniform standing helix (USH) mode liquid crystal display device.

Figure 8A:
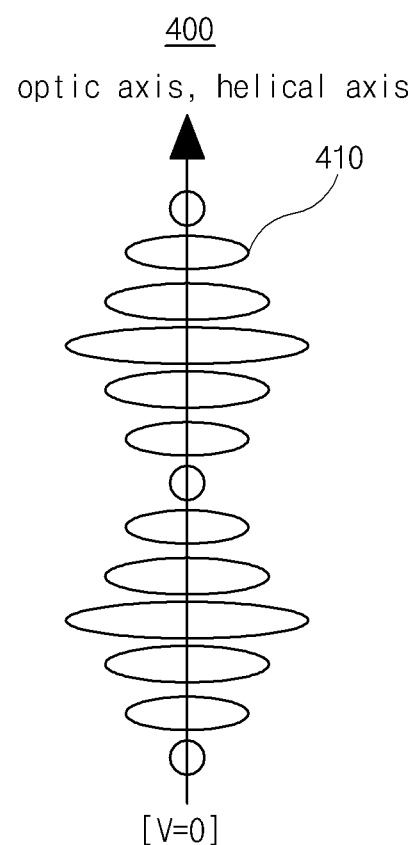

FIGS. 8A and 8B are side views showing an OFF state and an ON state, respectively, of a uniform standing helix liquid crystal layer for a liquid crystal display device according to a third embodiment of the present invention.

In FIGS. 8A and 8B, a uniform standing helix (USH) liquid crystal layer 400 includes chiral nematic liquid crystal molecules 410 having a helical structure where the chiral nematic liquid crystal molecules are twisted by several tens times along a helical axis. The chiral nematic liquid crystal molecules 410 having a short pitch are driven by using a flexoelectric effect. In FIG. 8A showing an OFF state of no driving voltage (V=0) (no horizontal electric field), an optic axis is parallel to the helix axis of the chiral nematic liquid crystal molecules 410. In FIG. 8B showing an ON state of a driving voltage (V≠0) (a horizontal electric field), the optic axis rotates to cross the helical axis and the chiral nematic liquid crystal molecules 410 have a birefringence property.

Figure 9A:
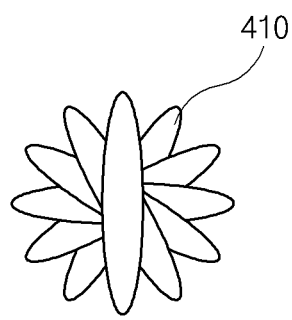
FIGS. 9A and 9B are front views showing an OFF state and an ON state, respectively, of a uniform standing helix liquid crystal layer for a liquid crystal display device according to a third embodiment of the present invention.
Figure 9B:
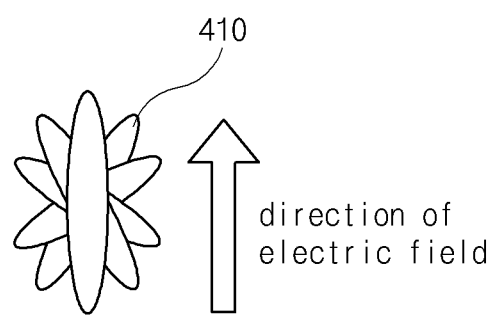

FIGS. 9A and 9B are front views showing an OFF state and an ON state, respectively, of a uniform standing helix liquid crystal layer for a liquid crystal display device according to a third embodiment of the present invention.

In FIGS. 9A and 9B, a uniform standing helix (USH) liquid crystal layer includes bimesogen liquid crystal molecules 410 arranged to have a polarity and has a relatively high response speed.

In FIG. 9A showing an OFF state of no driving voltage (V=0) (no horizontal electric field), chiral nematic liquid crystal molecules (USH liquid crystal molecules) 410 having a short pitch are twisted by several tens times along a helical axis in the USH liquid crystal layer 400 (of FIG. 8A) and the helical axis is parallel to an optic axis (z direction) which may be defined as a propagation direction of light. Accordingly, refractive indices of the USH liquid crystal layer along x and y directions perpendicular to the z direction are the same as each other at a front viewing angle. ($n_x = n_y$) As a result, the USH liquid crystal layer has an optically isotropic state at the front viewing angle.

In FIG. 9B showing an ON state of a driving voltage (V≠0) (a horizontal electric field), the chiral nematic liquid crystal molecules (USH liquid crystal molecules) 410 are re-aligned according to an electric field having a direction (x or y direction) perpendicular to the optic axis and the helical structure is distorted. As a result, the optic axis rotates to cross the helical axis and the chiral nematic liquid crystal molecules 410 have a birefringence property.

Similarly to the blue phase liquid crystal layer 200 (of FIG. 1), the optical properties of the USH liquid crystal layer 400 are adjusted by a horizontal electric field generated between electrodes. As a result, a USH mode LCD device may include a pixel electrode and a common electrode formed on the same substrate so that a horizontal electric field can be generated between the pixel electrode and the common electrode. In addition, first and second polarizing plates have first and second polarization axes, respectively, perpendicular to each other.

Since the chiral nematic liquid crystal molecules 410 in the USH liquid crystal layer 400 are re-aligned along a horizontal electric field parallel to a substrate to have a birefringence, the first and second polarizing plates are formed for obtaining a maximum brightness such that the first polarization axis of the first polarizing plate is perpendicular to the second polarization axis of the second polarizing plate. In addition, each of the first and second polarization axes may form an angle of about 45° with respect to the horizontal electric field. As a result, when no voltage is applied, the birefringence is not induced and the USH mode LCD device displays a black image. Further, when a voltage is applied, the birefringence is induced and the USH mode LCD device displays grey images with a relative high response speed.

However, the USH mode LCD device has a disadvantage of a relatively high driving voltage similarly to the blue phase LCD device. To reduce a driving voltage, the pixel electrode and the common electrode may be formed to have a height corresponding to a middle portion of the USH liquid crystal layer 400.

Figure 10A:
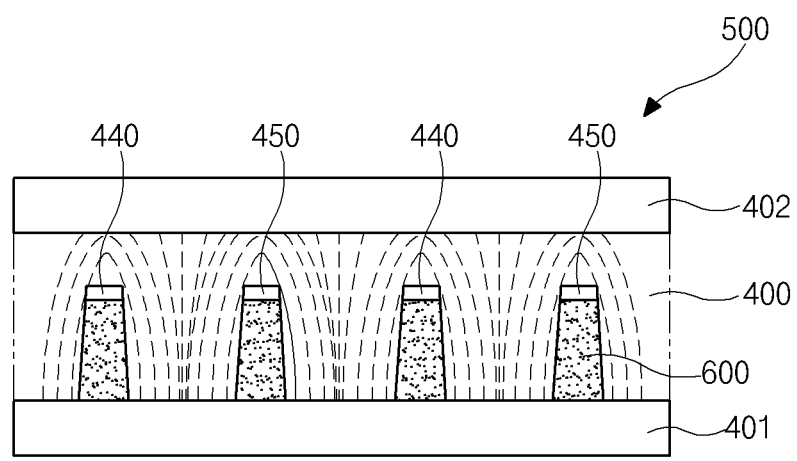
FIG. 10A is a cross-sectional view showing a pixel electrode and a common electrode of a uniform standing helix mode liquid crystal display device according to a second embodiment of the present invention.
Figure 10B:
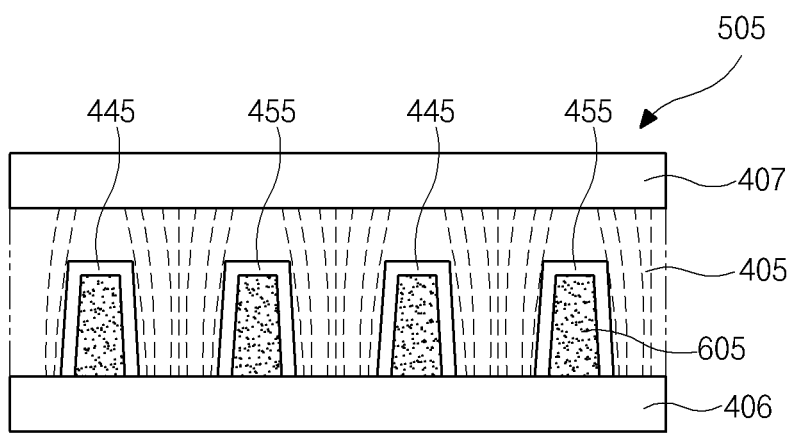
FIG. 10B is a cross-sectional view showing a pixel electrode and a common electrode of a uniform standing helix mode liquid crystal display device according to a fourth embodiment of the present invention.

FIG. 10A is a cross-sectional view showing a pixel electrode and a common electrode of a uniform standing helix mode liquid crystal display device according to a second embodiment of the present invention, and FIG. 10B is a cross-sectional view showing a pixel electrode and a common electrode of a uniform standing helix mode liquid crystal display device according to a fourth embodiment of the present invention.

In FIG. 10A, a uniform standing helix (USH) mode liquid crystal display (LCD) device 500 includes first and second substrates 401 and 402 facing and spaced apart from each other and a USH liquid crystal layer 400 between the first and second substrates 401 and 402. A plurality of insulating patterns 600 each having a relatively great thickness are formed on an inner surface of the first substrate 401. In addition, a plurality of pixel electrodes 440 and a plurality of common electrodes 450 are formed on the plurality of insulating patterns 600. Here, each of the plurality of pixel electrodes 440 and the plurality of common electrodes 450 is formed to cover a top surface of each of the plurality of insulating patterns 600 and expose a side surface of each of the plurality of insulating patterns 600. The plurality of pixel electrodes 440 are disposed alternately with the plurality of common electrodes 450 in each pixel region.

Each of the plurality of pixel electrodes 440 and the plurality of common electrodes 450 has a height corresponding to a middle portion of the USH liquid crystal layer 400 from the inner surface of the first substrate 401 due to the plurality of insulating patterns 600. For example, when the first and second substrates 401 and 402 are spaced apart from each other by a distance of about 10 μm (i.e., a cell gap of the USH mode LCD device 500 has a cell gap of about 10 μm), the plurality of insulating patterns 600 may have a thickness of about 1 μm to about 9 μm (i.e., a bottom surface of each of the plurality of pixel electrodes 440 and the plurality of common electrodes 450 may have a height of about 1 μm to about 9 μm).

When a driving voltage is applied to the plurality of pixel electrodes 440 and the plurality of common electrodes 450, a horizontal electric field is generated between the adjacent pixel and common electrodes 440 and 450. The dashed line of FIG. 10A shows an equipotential surface. As the height of the plurality of pixel electrodes 440 and the plurality of common electrodes 450 increases due to the plurality of insulating patterns 600, the equipotential surface is induced along a direction closer to a vertical direction. Since a direction of an electric field is perpendicular to the equipotential surface, the horizontal electric field is generated along a direction closer to a horizontal direction as compared with the horizontal electric field generated without the plurality of insulating patterns 600. As a result, a stronger horizontal electric field is generated in the USH liquid crystal layer 400 and the USH mode LCD device 500 is operated with a lower driving voltage.

In FIG. 10B, a uniform standing helix (USH) mode liquid crystal display (LCD) device 505 includes first and second substrates 406 and 407 facing and spaced apart from each other and a USH liquid crystal layer 405 between the first and second substrates 406 and 407. A plurality of insulating patterns 605 each having a relatively great thickness are formed on an inner surface of the first substrate 406. In addition, a plurality of pixel electrodes 445 and a plurality of common electrodes 455 are formed on the plurality of insulating patterns 605. Here, each of the plurality of pixel electrodes 445 and the plurality of common electrodes 455 is formed to cover a side surface and a tope surface of each of the plurality of insulating patterns 605. The plurality of pixel electrodes 445 are disposed alternately with the plurality of common electrodes 455 in each pixel region.

Each of the plurality of pixel electrodes 445 and the plurality of common electrodes 455 has a height corresponding to a middle portion or an upper portion of the USH liquid crystal layer 405 from the inner surface of the first substrate 406 due to the plurality of insulating patterns 605. For example, when the first and second substrates 406 and 407 are spaced apart from each other by a distance of about 10 μm (i.e., a cell gap of the USH mode LCD device 505 has a cell gap of about 10 μm), the plurality of insulating patterns 605 may have a thickness of about 1 μm to about 10 μm (i.e., a bottom surface of each of the plurality of pixel electrodes 445 and the plurality of common electrodes 455 may have a height of about 1 μm to about 10 μm).

When a driving voltage is applied to the plurality of pixel electrodes 445 and the plurality of common electrodes 455, a horizontal electric field is generated between the adjacent pixel and common electrodes 445 and 455. Since each of the plurality of pixel electrodes 445 and the plurality of common electrodes 455 is formed on the top and side surfaces of each of the plurality of insulating patterns 605, the horizontal electric field is generated between portions of the adjacent pixel and common electrodes 445 and 455 on the side surface of each insulating pattern 605 as well as between portions of the adjacent pixel and common electrodes 445 and 455 on the top surface of each insulating pattern 605. The dashed line of FIG. 10B shows an equipotential surface. As the height of the plurality of pixel electrodes 445 and the plurality of common electrodes 455 increases due to the plurality of insulating patterns 405, the equipotential surface is induced along a direction closer to a vertical direction. In addition, the equipotential surface is induced along a direction further closer to a vertical direction due to portions of the adjacent pixel and common electrodes 445 and 455 on the side surface of each insulating pattern 605. Since a direction of an electric field is perpendicular to the equipotential surface, the horizontal electric field is generated along a direction further closer to a horizontal direction as compared with the horizontal electric field generated only between portions of the adjacent pixel and common electrodes 445 and 455 on the top surface of each insulating pattern 605. As a result, a stronger and more uniform horizontal electric field is generated in the whole USH liquid crystal layer 405 and the USH mode LCD device 505 is operated with a lower driving voltage.

Specifically, since the horizontal electric field is generated between portions of the adjacent pixel and common electrodes 445 and 455 on the side surface of each insulating pattern 605, each insulating pattern 605 may have a thickness corresponding to the cell gap such that each of the pixel electrode 445 and the common electrode 455 contacts the second substrate 407 (substantially an overcoat layer 135 on an inner surface of the second substrate 102 of FIG. 1). For example, each insulating pattern 605 may have a thickness of about 10 μm in the blue phase mode LCD device 505 having a cell gap of about μm. When each insulating pattern 605 contacts the second substrate 407, each insulating pattern 605 may function as a patterned spacer maintaining the cell gap.

Consequently, in a liquid crystal display device according to the present invention, a horizontal electric field is strengthened and a driving voltage is reduced without reduction of transmittance and aperture ratio by forming each of pixel and common electrodes on an insulating pattern. Moreover, a horizontal electric field is further strengthened and a driving voltage is further reduced by forming each of pixel and common electrodes on top and side surfaces of an insulating pattern.

It will be apparent to those skilled in the art that various modifications and variations can be made in the liquid crystal display device of the present invention without departing from the sprit or scope of the invention. Thus, it is intended that the present invention covers the modifications and variations of this invention provided they come within the scope of the appended claims and their equivalents.

What is claimed is:
1. A liquid crystal display device, comprising:
first and second substrates facing and spaced apart from each other;

a gate line, a data line, and a common line on an inner surface of the first substrate, the gate line crossing the data line to define a pixel region, the common line parallel to the gate line;

a thin film transistor connected to the gate line and the data line;

a passivation layer on the gate line, the data line, the common line, and the thin film transistor, the passivation layer including a common contact hole exposing the common line and a drain contact hole exposing a drain electrode of the thin film transistor;

a plurality of insulating patterns on the passivation layer;

a plurality of pixel electrodes and a plurality of common electrodes on the plurality of insulating patterns, the plurality of pixel electrodes alternating with the plurality of common electrodes, the adjacent pixel and common electrodes generating a horizontal electric field according to a driving voltage, the plurality of common electrodes being connected to the common line through the common contact hole, the plurality of pixel electrodes being connected to the drain electrode of the thin film transistor through the drain contact hole, the plurality of pixel electrodes and the plurality of common electrodes being formed on the passivation layer and on the plurality of insulating patterns; and a liquid crystal layer between the first and second substrates, the liquid crystal layer including blue phase liquid crystal molecules, wherein the blue phase liquid crystal molecules are stabilized by a polymer, wherein the polymer is combined with the blue phase liquid crystal molecules having no directional property rather than the blue phase liquid crystal molecules having a directional property, wherein the polymer comprises an acrylic co-polymer comprising a co-polymer of a carboxylic monomer and a monomer co-polymerizable with the carboxylic monomer, and wherein each of the plurality of insulating patterns has a thickness corresponding to a cell gap between the first and second substrates so that the plurality of insulating patterns can maintain the cell gap.

2. The device according to claim 1, wherein the blue phase liquid crystal molecules have an optically isotropic state without the horizontal electric field and have an optically anisotropic state having a birefringence with the horizontal electric field.

3. The device according to claim 1, wherein the uniform standing helix liquid crystal molecules have an optically isotropic state at a front viewing angle without the horizontal electric field and have a birefringence with the horizontal electric field.

4. The device according to claim 1, wherein each of the plurality of pixel electrodes and the plurality of common electrodes covers a top surface of each of the plurality of insulating patterns and a side surface of each of the plurality of insulating patterns is exposed.

5. The device according to claim 1, wherein each of the plurality of pixel electrodes and the plurality of common electrodes covers top and side surfaces of each of the plurality of insulating patterns.

6. The device according to claim 5, wherein the first and second substrates are spaced apart by a distance of about 10 μm and each of the plurality of insulating patterns has a thickness of about 1 μm to about 10 μm.

7. The device according to claim 5, wherein each of the plurality of pixel electrodes and the plurality of common electrodes contacts the second substrate.

8. The device according to claim 1, wherein the plurality of pixel electrodes have a same material and a same layer as the plurality of common electrodes.

9. The device according to claim 1, wherein the plurality of insulating patterns include one of benzocyclobutene (BCB) and acrylic resin.

10. The device according to claim 1, further comprising a first polarizing plate on an outer surface of the first substrate and a second polarizing plate on an outer surface of the second substrate, wherein the first and second polarizing plates have first and second polarization axes, respectively, perpendicular to each other.

11. The device according to claim 1, wherein:
the carboxylic monomer is an unsaturated carboxylic acid; and
the unsaturated carboxylic acid comprises one of: an acrylic acid, a methacrylic acid, and a crotonic acid.

12. The device according to claim 11, wherein the monomer co-polymerizable comprising the carboxylic monomer includes one of: styrene, α-methylstyrene, and o-vinyltoluenethe.

* * * * *